United States Patent
Wachi

(10) Patent No.: US 7,856,381 B2
(45) Date of Patent: Dec. 21, 2010

(54) MUSICAL CONTENTS STORAGE SYSTEM HAVING SERVER COMPUTER AND ELECTRONIC MUSICAL DEVICES

(75) Inventor: Masatada Wachi, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 106 days.

(21) Appl. No.: 12/058,548

(22) Filed: Mar. 28, 2008

(65) Prior Publication Data
US 2008/0184161 A1    Jul. 31, 2008

Related U.S. Application Data

(62) Division of application No. 10/243,571, filed on Sep. 13, 2002, now Pat. No. 7,693,746.

(30) Foreign Application Priority Data

Sep. 21, 2001    (JP)    .............................. 2001-288703

(51) Int. Cl.
*G06Q 30/00*    (2006.01)
(52) U.S. Cl. ...................................... 705/26
(58) Field of Classification Search .................. 705/26, 705/27
See application file for complete search history.

(56) References Cited

U.S. PATENT DOCUMENTS

| | | |
|---|---|---|
| 4,898,059 A | 2/1990 | Iizuka |
| 5,616,879 A | 4/1997 | Yamauchi et al. |
| 5,915,238 A | 6/1999 | Tjaden |
| 6,119,109 A | 9/2000 | Muratani |
| 6,192,340 B1 | 2/2001 | Abecassis |
| 6,351,776 B1 | 2/2002 | O'Brien et al. |
| 6,385,596 B1 * | 5/2002 | Wiser et al. ................ 705/51 |
| 6,469,239 B1 | 10/2002 | Fukuda |
| 6,988,087 B2 | 1/2006 | Kanai et al. |

(Continued)

FOREIGN PATENT DOCUMENTS

EP    0777208 A1    6/1997

(Continued)

OTHER PUBLICATIONS

Patent Application for U.S. Appl. No. 09/672,908, entitled System of Electronic Musical Instrument and Mobile Wireless Terminal Set.

(Continued)

*Primary Examiner*—Mila Airapetian
(74) *Attorney, Agent, or Firm*—Morrison & Foerster LLP

(57) ABSTRACT

A musical contents system comprises a contents providing server comprising a connecting unit that connects to a communication network, and a contents storage unit that stores musical contents in a storage area corresponding to a user of an electronic musical device; and an electronic musical device comprising a connecting unit that connects to the contents providing server via the communication network, an accessing unit that accesses to the contents storage unit via the communication network, and a contents operating unit that performs an operation to the musical contents stored in the contents storage area corresponding to the user. The musical contents purchased or created by the user can be stored in a data center; therefore, convenience of using the musical contents is improved and the cost is decreased or cut off.

6 Claims, 13 Drawing Sheets

U.S. PATENT DOCUMENTS

| | | | |
|---|---|---|---|
| 7,209,892 | B1 | 4/2007 | Galuten et al. |
| 7,693,746 | B2 | 4/2010 | Wachi et al. |
| 2001/0007960 | A1 | 7/2001 | Yoshihara |
| 2001/0044848 | A1 | 11/2001 | Kikuchi et al. |
| 2002/0002513 | A1 | 1/2002 | Chiasson |
| 2002/0180803 | A1* | 12/2002 | Kaplan et al. ............... 345/810 |
| 2003/0005138 | A1 | 1/2003 | Giffin et al. |
| 2003/0061115 | A1 | 3/2003 | Wachi |
| 2008/0183487 | A1 | 7/2008 | Wachi |
| 2008/0183594 | A1 | 7/2008 | Wachi |
| 2008/0215674 | A1 | 9/2008 | Wachi |

FOREIGN PATENT DOCUMENTS

| | | |
|---|---|---|
| EP | 1083494 | 3/2001 |
| JP | 10187267 | 7/1988 |
| JP | 06-350729 A | 12/1994 |
| JP | 63-50729 | 12/1994 |
| JP | 7-225775 | 8/1995 |
| JP | 10-124586 | 5/1998 |
| JP | 11-015468 | 1/1999 |
| JP | 11-134798 | 5/1999 |
| JP | 2001-084220 | 3/2001 |
| JP | 2001-100742 | 4/2001 |
| JP | 2001-195064 | 7/2001 |
| JP | 2001-209696 | 8/2001 |
| JP | 2001-231027 | 8/2001 |
| JP | 2002-312699 | 10/2002 |
| WO | WO-99/42996 | 2/1999 |
| WO | WO-01/16931 | 3/2001 |

OTHER PUBLICATIONS

Jeff Tyson, "How the Old Napster Worked".
Nikkei Computer, No. 510, Dec. 4, 2000.
English Translation of JP Office Action, mailed Jul. 8, 2008, JP Patent Application No. 2005-315680.
English Translation of Nikkei Computer No. 510, Dec. 4, 2000.
European Patent Office Communication pursuant to Article 94(3) EPC, dated Nov. 7, 2008, for EP Application No. 07102801.3 (4 pages).
Chinese Office Action mailed Feb. 17, 2006, for CN Application No. 02142455.1, with English translation, 23 pages.
English Translation of JP 2001-231027, published Aug. 24, 2001, 21 pages.
European Office Action mailed Oct. 30, 2006, for EP Application No. 02019816.4, five pages.
European Search Report mailed Jun. 18, 2007, for EP Application No. 07102785.8, six pages.
European Search Report mailed Jun. 19, 2007, for EP Application No. 07102801.3, eight pages.
Japanese Office Action mailed Aug. 30, 2005, for JP Application No. 2001-288703, with partial English translation, 10 pages.
Snider, M. (Mar. 2, 2000). "Building a 'Jukebox in the Sky': Entertainment's Future Could Turn CD's and Tapes into Relics of the Past," USA Today, located at <http://proguest.umi.com/pdqweb?index=0&did=50697518&SrchMode=1&sid=...VInst=PROD&VType=PDQ&RQT=309&VName=PQD&TS=1276124299&clientld=19649(1 of 5)Jun. 9, 2010 6:59:29PM>, five pages.
Notice of Reasons of Rejection mailed Nov. 27, 2007, for JP Application No. 2005-315679, with English Translation, six pages.
Notice of Reasons of Rejection mailed Nov. 27, 2007, for JP Application No. 2005-315681, with English Translation, five pages.

* cited by examiner

MUSICAL CONTENTS STORAGE SYSTEM HAVING SERVER COMPUTER AND ELECTRONIC MUSICAL DEVICES

CROSS REFERENCE TO RELATED APPLICATION

This is a divisional of U.S. patent application Ser. No. 10/243,571, filed on Sep. 13, 2002, which is based on Japanese Patent Application 2001-288703, filed on Sep. 21, 2001, the entire contents of both which are incorporated herein by reference.

BACKGROUND OF THE INVENTION

A) Field of the Invention

This invention relates to a musical contents storage system wherein a server computer connected to a plurality of electronic musical devices via a communication network and having a function to store musical information of each electronic musical device.

B) Description of the Related Art

Musical information used and produced at an electronic musical device such as an electronic musical instrument, a personal computer having a tone generating function, a mobile information terminal and a communication karaoke device or the like is stored in a storage medium such as a hard disk and a memory device which are equipped in the device itself or a flexible disk and a CD-R or the like which are attached to the devices by a user of the electronic musical device. Also, a case that ready-made musical information is purchased in the form of the flexible disk and the CD or the like and used in the electronic musical device is common.

In the case of using the hard disk, the musical information needs to be controlled by the user constantly. And in the case of the storage medium such as the flexible disk and the CD-R, an extreme effort is required to sort out a multiplicity of musical information and to access to the desired musical information. Also, stored or purchased musical note information might be lost by a break down of the memory device storing the musical information itself. Therefore, a high cost for maintaining, obtaining and purchasing the necessary musical information to the electronic musical device is unavoidable.

SUMMARY OF THE INVENTION

It is an object of the present invention to provide a musical contents storage system that can store musical contents purchased or created by a user in a data center instead of in the user side to improve the convenience at the time of using the musical contents, and can achieve decrease and cut back of the cost.

According to one aspect of the present invention, there is provided an electronic musical device, comprising: a connecting unit that connects with a contents providing server having a storage area corresponding to a user of the electronic musical device and storing musical contents via a communication network; a temporally storage unit that temporally stores the musical contents received from the contents providing server via the communication network in accordance with a contents transmitting request to the contents providing sever; a contents operating unit that performs an operation to the musical contents stored in the temporally storage unit; and a deleting unit that compulsory deletes the musical contents from the temporally storage unit in accordance with a termination of the contents operation.

According to another aspect of the present invention, there is provided an electronic musical device, comprising: a connecting unit that connects with a contents providing server having a storage area corresponding to a user of the electronic musical device and storing musical contents via a communication network; a transmitting unit that transmits an identifier of the electronic musical device or a user to the contents providing server in accordance with turning on of the electronic musical device; a receiving unit that receives display data relating to the storage area corresponding to the user and transmitted from the contents providing server in accordance with the transmitted identifier; a displaying unit that displays a screen relating to the storage area in accordance with the received display data; and an operating unit that performs an operation to the storage area based on the screen.

According to further aspect of the present invention, there is provided a musical contents providing server, comprising: a connecting unit that connects with an electronic music device via a communication network; a contents storage unit that has a first storage area storing a plurality of musical contents and a second storage area corresponding to a user of the electronic musical device; a purchase receipting unit that receipts, from the electronic musical device, a purchase instruction of the musical contents in accordance with an operation of copying the musical contents from the first storage area to the second storage area; and a charging unit that charges to the user based on the musical contents instructed to be purchased.

According to further aspect of the present invention, there is provided a musical contents providing server, comprising: a connecting unit that connects with an electronic music device via a communication network; a contents storage unit that stores a plurality of musical contents; and a transmitting unit that transmits display data relating to musical contents appropriate for the electronic musical device accessing to the musical content providing server to the accessing electronic music device via the communication network, the musical contents being extracted from the plurality of the musical contents stored in the contents storage unit.

According to further aspect of the present invention, there is provided a musical contents providing server, comprising: a connecting unit that connects with an electronic music device via a communication network; a contents storage unit that stores musical contents that can be operated from the electronic musical device in a storage area corresponding to a user of the electronic musical device; a charging unit that charges on storing newly purchased musical contents into the storage area; and a discounting unit that discounts a server usage fee based on the charge charged by the charging unit.

According to further aspect of the present invention, there is provided a musical contents providing server, comprising: a connecting unit that connects with an electronic music device via a communication network; a contents storage unit that stores musical contents that can be operated from the electronic musical device in a storage area corresponding to a user of the electronic musical device; a detecting unit that detects an amount of the musical contents stored in the storage area; and a determining unit that determines a server usage fee based on the detected amount of the musical contents.

According to further aspect of the present invention, there is provided a musical contents providing server, comprising: a connecting unit that connects with an electronic music device via a communication network; a contents storage unit that stores a plurality of musical contents; a contents extracting unit that extracts musical contents from the contents storage unit in accordance with a search condition instructed by the electronic musical device; and a transmitting unit that transmits display data for the extracted musical contents to the electronic musical contents via the communication network.

According to yet further aspect of the present invention, there is provided a musical contents system, comprising: a contents providing server comprising a connecting unit that connects to a communication network, and a contents storage unit that stores musical contents in a storage area corresponding to a user of an electronic musical device; and an electronic musical device comprising a connecting unit that connects to the contents providing server via the communication network, an accessing unit that accesses to the contents storage unit via the communication network, and a contents operating unit that performs an operation to the musical contents stored in the contents storage area corresponding to the user.

According to yet further aspect of the present invention, there is provided a musical contents system, comprising: a contents providing server comprising a connecting unit that connects to a communication network, and a contents storage unit that stores musical contents in a storage area corresponding to a group consisted of users of a plurality of electronic musical devices; and a plurality of electronic musical devices, each electronic musical device comprising a connecting unit that connects to the contents providing server via the communication network, an accessing unit that accesses to the contents storage unit via the communication network, and a contents operating unit that performs an operation to the musical contents stored in the contents storage area corresponding to a group to which a user belongs.

According to the present invention, musical contents is stored in a storage area ("my document" and "shared" folders) corresponding to a user and provided in a contents providing server, and the musical contents is manipulated from a side of an electronic musical device such as a music specified device like an electronic musical instrument, a mobile information terminal and a personal computer through a communication network such as the Internet. Therefore, the user can access to the musical contents anytime for a desired amount. Also, when the mobile electronic musical device such as the mobile information terminal is used, the musical contents are taken from everywhere.

Also when the musical contents are edited or newly created on the electronic musical device side, the edited or created musical contents are sent to the contents providing server and are stored in the storage area corresponding to the user on the server side. Therefore, the musical contents edited or created on the electronic musical device side are stored in a large capacity contents storage device on the server side instead of being stored on the user side, and more convenience reusability and cost cut-back can be achieved. Further, because the contents providing server permits an access to the capacity contents storage by confirming a user identifier sent from the electronic musical device, the security of the musical contents stored in the contents storage device can be obtained.

According to the present invention, by accessing to the storage devices in the contents providing server from the electronic musical device, the musical contents stored in the storage area ("shared" folder) corresponding to a group to which users of the electronic musical devices belong can be read and manipulated cooperatively. Therefore, the plurality of users sharing the storage area can coauthor the musical contents.

According to the present invention, when the electronic musical device accesses the contents storage device in the musical contents providing server and copies the musical contents stored in the first storage area ("pay contents" folder) to the second storage area ("my document"/"shared" folder), the musical contents providing server performs a charging process in accordance with that copying manipulation. Therefore, purchase of the musical contents and the charging process for that can be performed in a very effective way.

According to the present invention, the musical contents providing server transmits display data of the musical contents being appropriate to the accessing to the contents providing server to the electronic musical device in order not to transmit the musical contents being inappropriate to or unnecessary for the accessing electronic musical device. Therefore, the user of the electronic musical device may not be confused.

According to the present invention, when a newly purchased musical contents is stored in the storage area ("my document", "shared" folder) corresponding to the user, the musical contents providing server performs the charging process for that and discounts a server usage fee at a mean time. Therefore, not only the charging process can be performed easily, but also the process for the discount service of the server usage fee can be performed effectively.

According to the present invention, the musical contents providing server detects the amount of the musical contents stored in each storage area ("my document", "shared" folder) corresponding to the user, and the server usage fee is decided according to the detected amount of the musical contents. Therefore, an appropriate service processes in accordance with the usage conditions of the contents storage device of the server side can be performed effectively. Also as above, because a change of the capacity of storage area can be contracted, the necessary musical contents can be stored at a necessary storage cost.

According to the present invention, when a phrase is instructed as a search condition from the electronic musical device side, a searching service wherein a list of the musical contents is transmitted to the electronic musical device as the display data, the searched musical contents being stored in the contents storage device and including a phrase matched or similar to the phrase. Therefore, the musical contents corresponding to the desired phrase can be searched from the abundant musical contents stored in the server from a point of view different from a classification of the musical contents on the server, and the convenience of using the musical contents is improved.

According to the present invention, the musical contents that the user can purchase and the musical contents that the user purchased are respectively stored in the first and the second storage area corresponding to the usage types (the "pay contents" folder and the "my document"/"shared" folders), therefore, in the searching service, the musical contents can be extracted by including the usage type of the musical contents in the search condition. Also, the musical contents may be stored by categorizing the types of the musical contents (e.g., SMF, a ringer melody, a score, etc.), and thereby, in the searching service, the musical contents can be extracted by including the category of the musical contents in the search condition. Therefore, convenience of using the musical contents can be improved by searching fast and easily from the abundant musical contents stored in the server.

According to the present invention, after turning on the electronic musical device, in accordance with that, the information stored in the storage areas ("my document" and "shared" folders) corresponding to the user in the contents providing server is displayed as being ready to be manipulated. Therefore, the user can handle the musical contents stored in the contents providing server as it is stored in the electronic musical device.

DETAILED DESCRIPTION OF THE PREFERRED EMBODIMENTS

Figure 1:
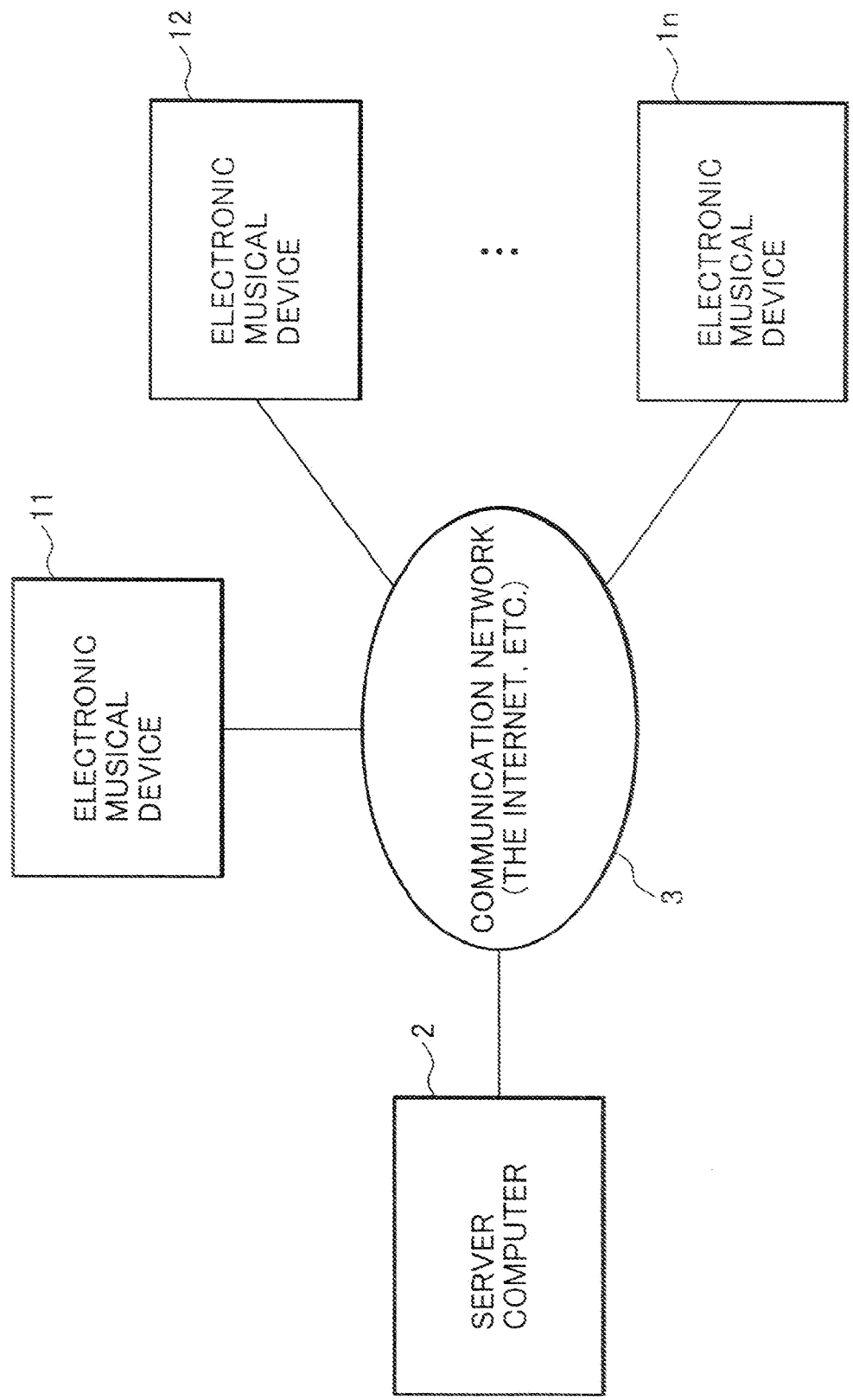
FIG. 1 is a schematic block diagram showing a whole musical contents storage system according to one embodiment of the present invention.

FIG. 1 is a schematic block diagram showing a whole musical contents storage system according to one embodiment of the present invention. In this example, the system is consisted of a plurality of electronic musical devices 11 to 1n and a server computer (contents providing server), each of which is connected to communicate with each other via a communication network 3 such as the Internet, etc. The electronic musical devices 11 to 1n (an individual electronic musical device may be represented by reference symbols such as "1", "1a" or "1b") are information process devices, each having a communication interface, called as "musical information using terminals". The electronic musical device may be an electronic device specialized in music, a personal computer (PC) that can handle with musical information, a mobile communication terminal such as a cellular phone, a communication karaoke system, a music game device, etc.

The musical contents storage system according to the embodiment of the present invention will be explained briefly with reference to FIG. 1. The server computer 2 and the plurality of the electronic musical device 11 to 1n are connected to communicate via the communication network 3. In the contents storage device of the server computer 2, musical contents created or purchased by each user is stored in a storage area (under "my document" or "shared" folder) corresponding to a user of each electronic musical device. When one electronic musical device 1 accesses to the contents providing server 2, the musical contents stored in the storage area corresponding to the user of the electronic musical device is read immediately, and the user of the electronic musical device can perform various kinds of operations to the read musical contents, the operations including confirmation of the profile, editing the title, reproducing, editing (refreshing), deleting, copying, etc. Also, the musical contents edited by one of the operations can be stored in the storage area corresponding to the user.

The server computer 2 stores the electronic musical information (musical contents) such as the MIDI data, the electronic score data, the ringer melody, the karaoke song, etc. used in each of electronic musical devices 11 to 1n. The server computer 2 is a data center, also called as musical contents providing server, which works as a musical contents storage device temporally providing necessary musical information in accordance with necessity of the user to each of electronic musical devices 11 to 1n. The server computer 2 is not only a musical information storing/providing site, but also can be an offering site of text information such as news, etc., picture information such as a wait display, etc., a shopping site or an information searching site.

Figure 2:
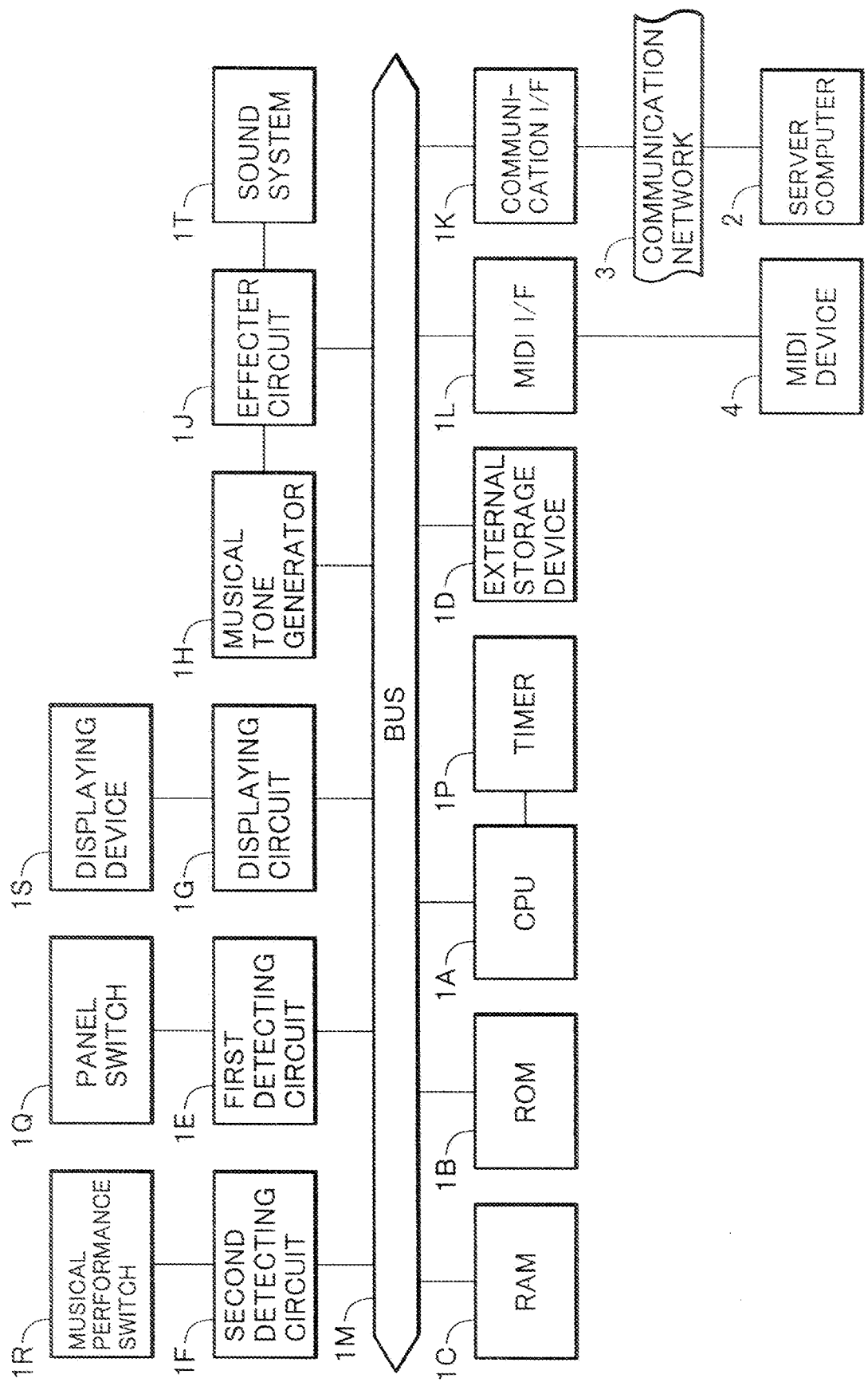
FIG. 2 is a block diagram showing a hardware structure of the electronic musical device according to the embodiment of the present invention.

FIG. 2 is a block diagram showing a hardware structure of the electronic musical device according to the embodiment of the present invention. In this example, the musical information using terminal (electronic musical device) 1 such as an electronic musical instrument or a PC has a CPU 1A, a read only memory (ROM) 1B, random access memory (RAM) 1C, a external storage device 1D, a first detecting circuit 1E, a second detecting circuit 1F, a displaying circuit 1G, a musical tone generator 1H, an effecter circuit 1J, a communication interface (communication I/F) 1K, a MIDI interface (MIDI I/F) 1L, etc., and these devices 1A to 1L are connected with each other via a bus 1M.

The CPU 1A mainly executes various controls including a musical information process and a terminal side musical contents providing process for receiving musical information (contents) from the server 1 by using a clock signal from a timer 1P in accordance with a predetermined software program. The ROM 1B stores a control program related to the terminal side musical contents providing process and data necessary for the musical information process, etc. beforehand. The RAM 1C stores data and parameters necessary for each process and is used as a working area for temporally storing various data, etc. in a process.

The external storage device 1D is consisted of the hard disk drive (HDD) and a device using a mobile storage device such as a compact disk read only memory (CD-ROM), a flexible disk (FD), a magneto-optical (MO) disk, a digital versatile disk (DVD), a semiconductor memory, or the like. For example, they are used for storing various kinds of information used in the electronic musical device 1 and also can store various programs related to the contents providing from the server 1.

The first detecting circuit (panel operation detecting circuit) 1E detects the contents of the setting-up/controlling operation by a panel switch 1Q such as a switch connected to this or the like and imports it in the electric musical device 1. The panel switch 1Q is the switch inputting various kinds of information for setting up an operation status and communicating with the server computer 2. When the electronic musical device 1 is the electronic device specialized in music, various switches on the operating panel are used. And when the electronic musical device 1 is the PC, a keyboard and a pointing device such as a mouse or the like are used.

The second detecting circuit (musical performance detecting circuit) 1F detects musical performance by a musical performance switch 1R such as a musical keyboard connected to this to input it in the electronic musical device 1. The musical performance switch 1R is the musical performance switch for inputting musical performance information according to the musical performance operation of the user. The switch specialized in musical performance such as the musical keyboard or the like is used in the case of the electronic device specialized in music such as the electronic musical instrument, and a designated key on the keyboard is assigned for musical performance operation at the time of musical performance mode in the case of the PC.

The displaying circuit 1G controls displaying contents of a displaying device 1S connected to this according to the instruction from the CPU 1A, and the displaying device 1S has a display and various indicators.

The musical tone generator 1H is connected to the effecter circuit 1J including the DSP, and the effecter circuit 1J is connected to the sound system 1T including a D/A converter, an amp and a speaker. A musical tone generating unit that generates a musical tone in accordance with musical information by the user's performance or received from the external device is formed of the musical tone generators 1H, 1J and 1T.

The communication I/F 1K connects the electronic musical device 1 (1a) to communicate with the server computer 2 and other electronic musical device (1b). For example, information provided from the server computer 1 can be stored temporarily in the RAM 1C via the communication network 3. Also, the MIDI I/F 1L connects to other electronic musical device 4 that can handle with MIDI-type musical information, and the MIDI musical information can be transferred by that.

Further, a hardware such as a mobile communication terminal or a communication karaoke system can be formed to use the musical information by communicating with the server 2 similar to that in FIG. 2 although it is not shown in a drawing. For example, in the case of the mobile communication terminal (the mobile musical information using terminal) such as a cellular phone, in additions to the default hardware structure of the mobile communication terminal such as a radio transmitting/receiving circuit including an antenna and a voice input/output device and a voice transmitting/receiving process including a microphone and a voice speaker (a receiver), following structures may be included: a data processing circuit that enables to use the musical information by communicating the server 2; a musical tone generating unit including a musical tone generator and a loud speaker for a musical tone (a sounder) for reproducing a ringer melody with a melody and a karaoke song; and an interface for transmitting and receiving various data and programs to/from other information device.

The server computer 2 has almost the same hardware structure as the hardware structure shown in FIG. 2. Especially, many musical information files (contents) such as the MIDI data, the electronic score data, the ringer melody and the karaoke song or the like are stored, and information is transferred to many electronic musical devices 11 to 1n. Therefore, an exclusive server machine which has a large capacity external storage device (HDD) and a fast CPU will be preferable; however, the musical performance switch or the second detecting circuit, the musical tone generator formed in the musical tone generator or the sound system and the MIDI I/F or the like are not necessary.

By the structures described above, the server computer 2 executes various controls, the server side musical contents providing process related to the storage and offering of the musical information and communicate with the electronic musical devices 11 to 1n via the communication I/F and the communication network 3 in accordance with the predetermined software program as similar to FIG. 2 mainly by the CPU. Many musical contents are arranged into a tree structure and stored with being classified by the usage types or categories because musical contents is provided to many electronic musical devices 11 to 1n in the external storage device of the server computer 2. For example, in the case of the mobile communication terminal (the mobile musical information using terminal) such as a cellular phone, in addition to the default hardware structure of the mobile communication terminal such as a radio transmitting/receiving circuit including an antenna and a voice input/output device and a voice transmitting/receiving process including a microphone and a voice speaker (a receiver), following structures may be included: a data processing circuit that enables to use the musical information by communicating the server 2; a musical tone generating unit including a musical tone generator and a loud speaker for a musical tone (a sounder) for reproducing a ringer melody with a melody and a karaoke song; and an interface for transmitting and receiving various data and programs to/from other information device.

Figure 3:
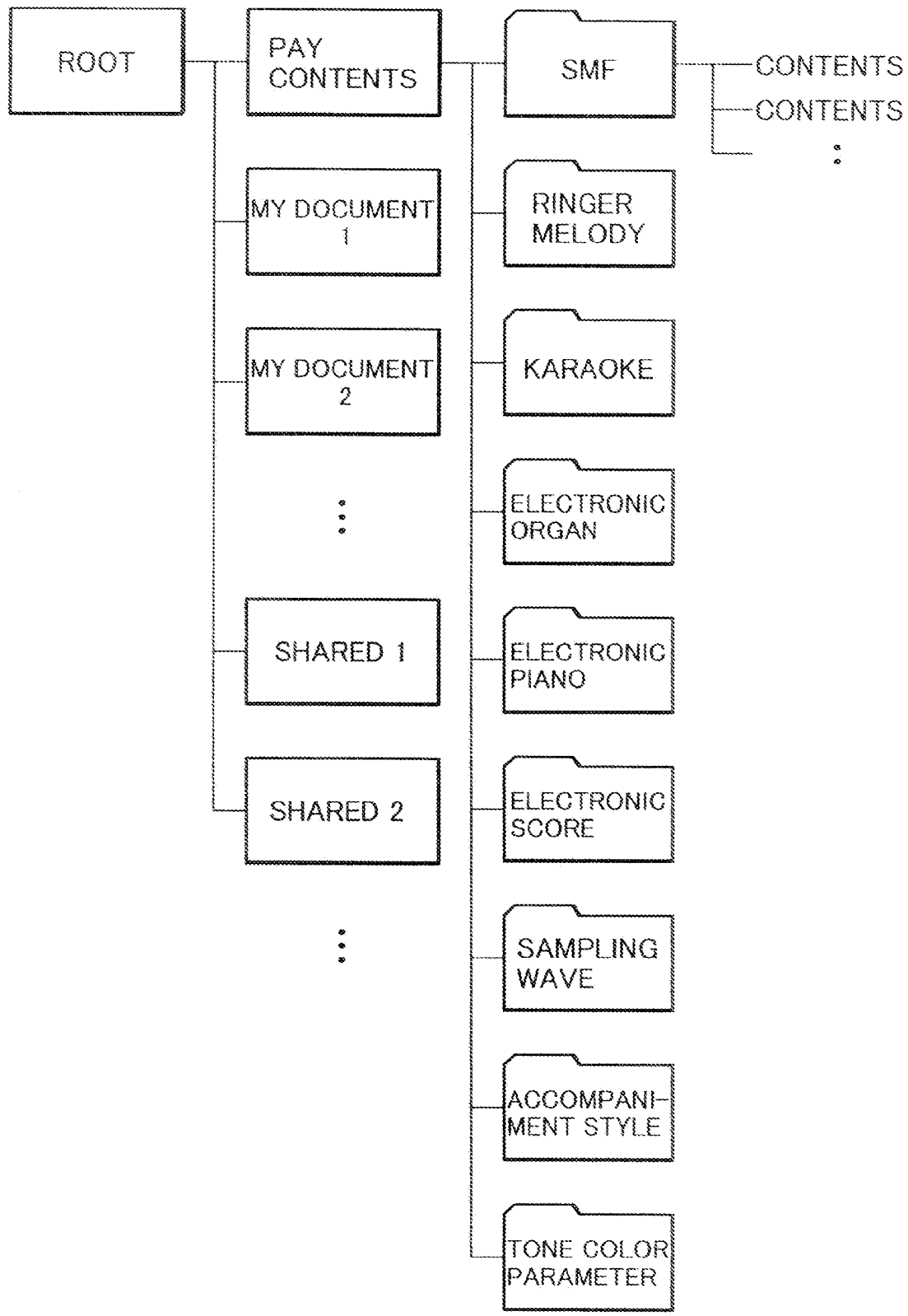
FIG. 3 is a diagram showing a folder structure of the storage device in the contents providing server computer according to the embodiment of the present invention.

According to the embodiment of the present invention, when one of the electronic musical devices 11 to 1n accesses to the server computer 2, it can immediately receive a musical information file (musical contents) from the storage device of the server computer 2. FIG. 3 is a schematic diagram showing a folder structure of the musical contents in the storage device of the server computer according to the embodiment of the present invention.

Musical contents available for the plurality of the electronic musical devices 11 to 1n are stored, as shown in FIG. 3, in the musical contents root folder (hereinafter called "root" folder) of the storage device in the server computer 2. In a second layer just below the musical contents root folder are a pay contents folder, a plurality (the number of j that is greater than the number of n) of "my document" folders such as "my document 1", "my document 2", etc., each of which can be used individually by each of the users of the plurality (the number of n) of the electronic musical device 11 to 1n, and a plurality (the number of k) of "shared" folders such as "shared 1", "shared 2", etc., each of which can be used by the users of the plurality (the number of n) of the electronic musical devices 11 to 1n who are in a sharing relations. Each "shared" folder is a folder shared by the users of the plurality of the electronic musical devices belonging to one group. Each user can participate in a group at the time of the later-described user registration or anytime after the use registration.

Moreover, in a third layer below the "pay contents" folder, plurality of folders classified into the categories such as a SMF, the ringer melody, the karaoke, an electronic organ, an electronic piano, the electronic score, sampling waves, accompaniment styles and tone color parameters, etc. are stored in each type of musical information. Also, in folders such as other my document folder and shared folder in the same layer as the "pay contents" folder, similar classified folders are stored (not shown in the drawing).

The plurality of musical information files which belong to the categories of the musical information are stored under these classified folders as a fourth layer (file storing layer). For example, a SMF (Standard MIDI File) type standard musical information file is stored in the "SMF" folder, various ringer melody song information is stored in the "ringer melody" file, karaoke song information is stored in the "karaoke" folder and musical information specialized in the electronic organ and the electronic piano are stored in the "electronic organ" and "electronic piano" folders.

Figure 4:
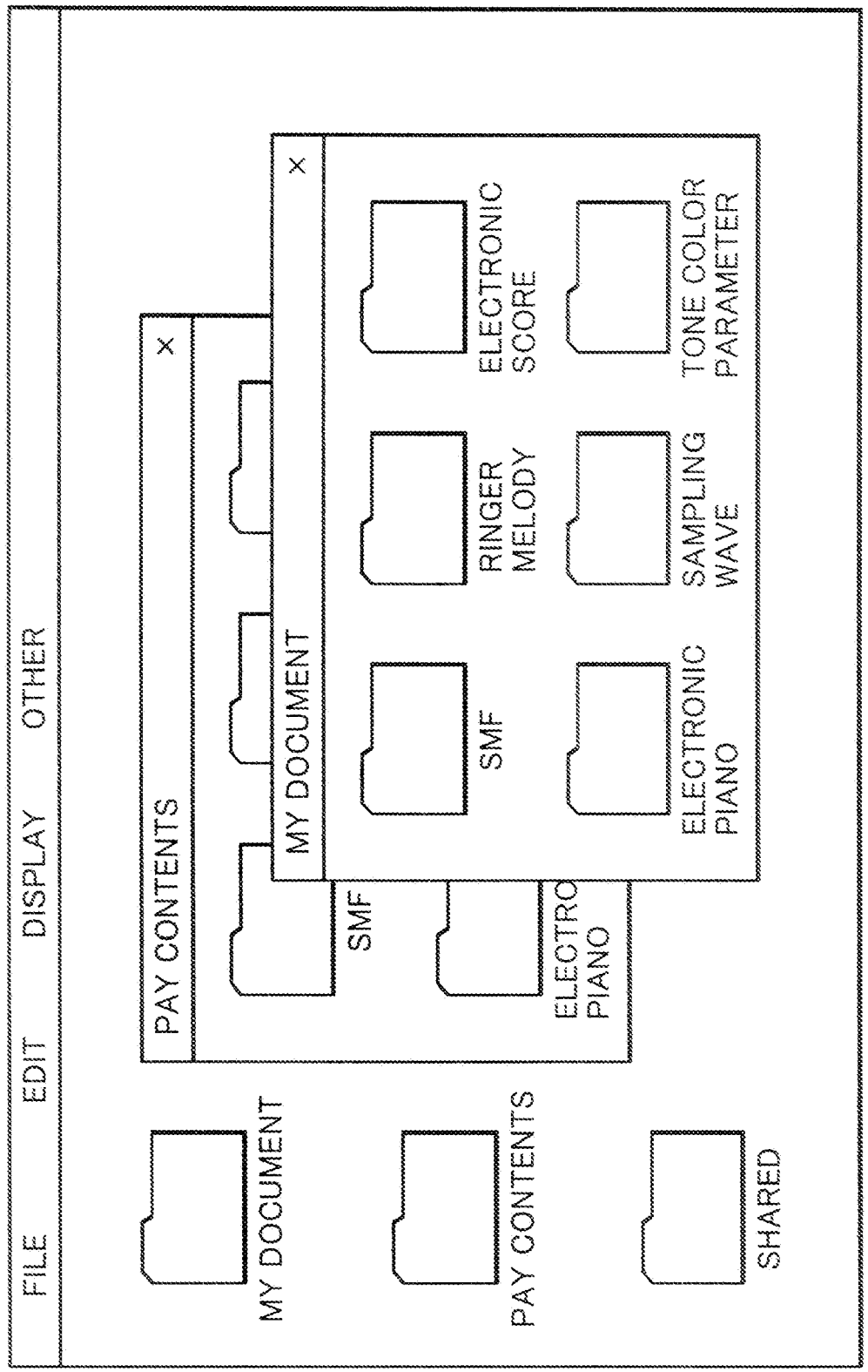
FIG. 4 is a diagram showing an example of a display screen in the electronic musical device according to the embodiment of the present invention.

According to the embodiment of the present invention, when one user accesses to the server computer from an electronic musical device, an accessible folder is displayed on the display of the electronic musical device corresponding to that. FIG. 4 is a diagram showing an example of a display screen in the electronic musical device according to the embodiment of the present invention.

When one user accesses to the contents providing server 2 from one electronic musical device, icons of the "pay contents" folder and the "my document" and "shared" folders which are usable my document folder and shared folder in the electronic musical device is displayed in a list. When icons representing the "pay contents" folder and the "my document" folder are operated (double clicked) sequentially to open, for example, a "pay contents" window and a "my document" window that show lists of third layer folders below the "pay contents" folder and the "my document" folder are displayed on the display 1S shown in FIG. 4.

Figure 5:
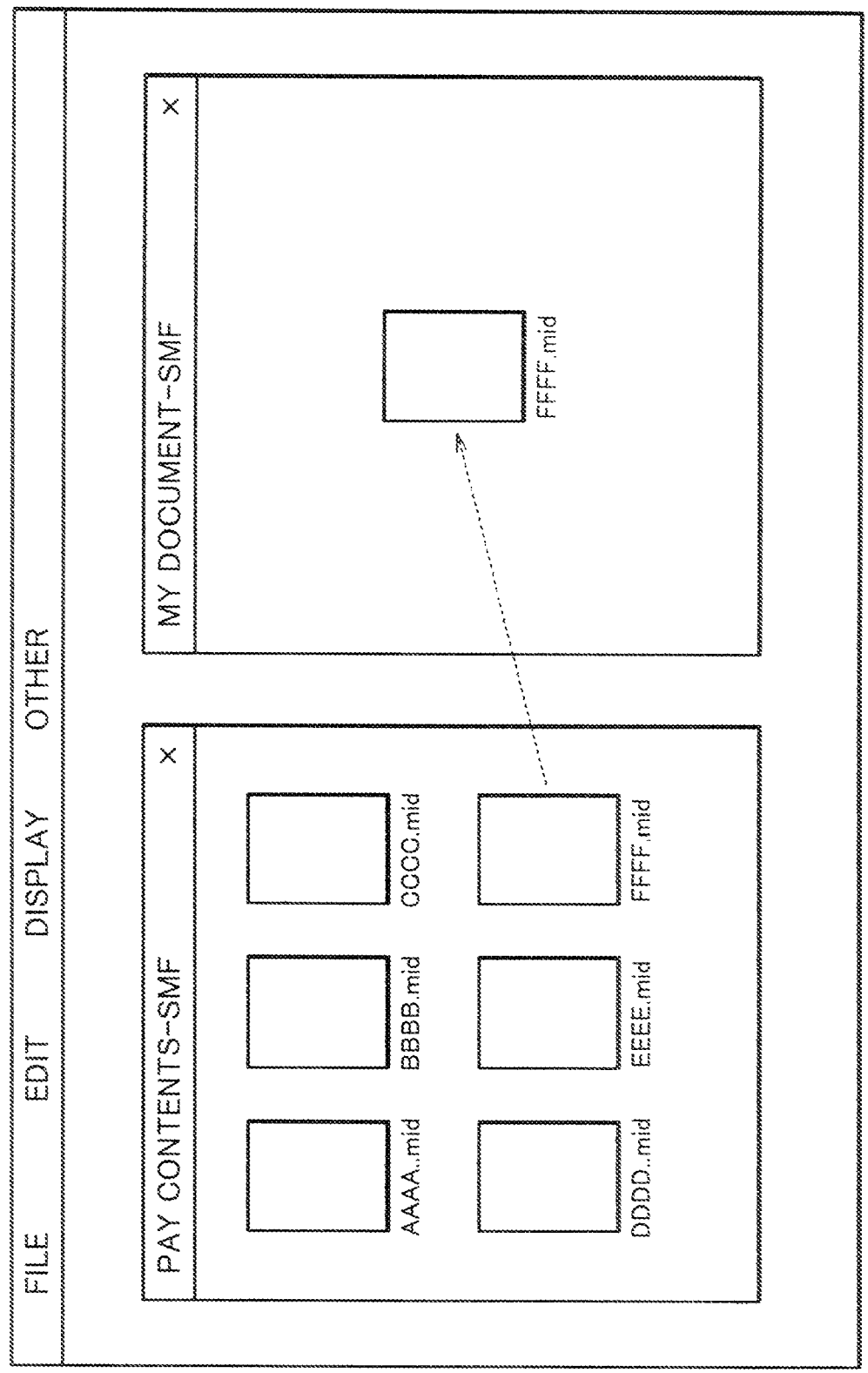
FIG. 5 is a diagram showing another example of a display screen in the electronic musical device according to the embodiment of the present invention.

According to the embodiment of the present invention, the musical information file is purchased by operating the folder icons displayed on the display screen of the electronic musical device and copying the musical information file (musical contents) from the "pay contents" folder to the "my document" folder. FIG. 5 is a diagram showing an example of the display screen in the electronic musical device in this case.

On the display screen in FIG. 4, for example, when the "SMF" folder icon in the "pay contents" window "SMF" folder icon in the "my document" window are manipulated (double click), as shown in FIG. 5, a "pay contents-SMF" window and a "my document-SMF" window are displayed on the display 1S. In the drawing, icons or texts representing a large number of the SMF musical information files stored in the "SMF" folder in the "pay contents" folder are listed on the "pay contents-SMF" window (six of a multiplicity of them are displayed in FIG. 5). On the other hand, the "my document-SMF" window is blank, and no musical information file stored in the "SMF" folder in the "my document" folder is displayed. A display of the property of a title, a lyrics writer, a composer, and an artist or the like of each contents may be performed.

As shown in the drawing, an icon representing desired contents (for example "FFFFmid") is pointed from the "pay contents-SMF" window, and copying operation such as drag and drop to the "my document-SMF" window is performed. Then the musical information file is copied from the "pay contents" folder to the "my document" folder and can be purchased by this process. Also, a charging process is executed at this time.

Figure 6:
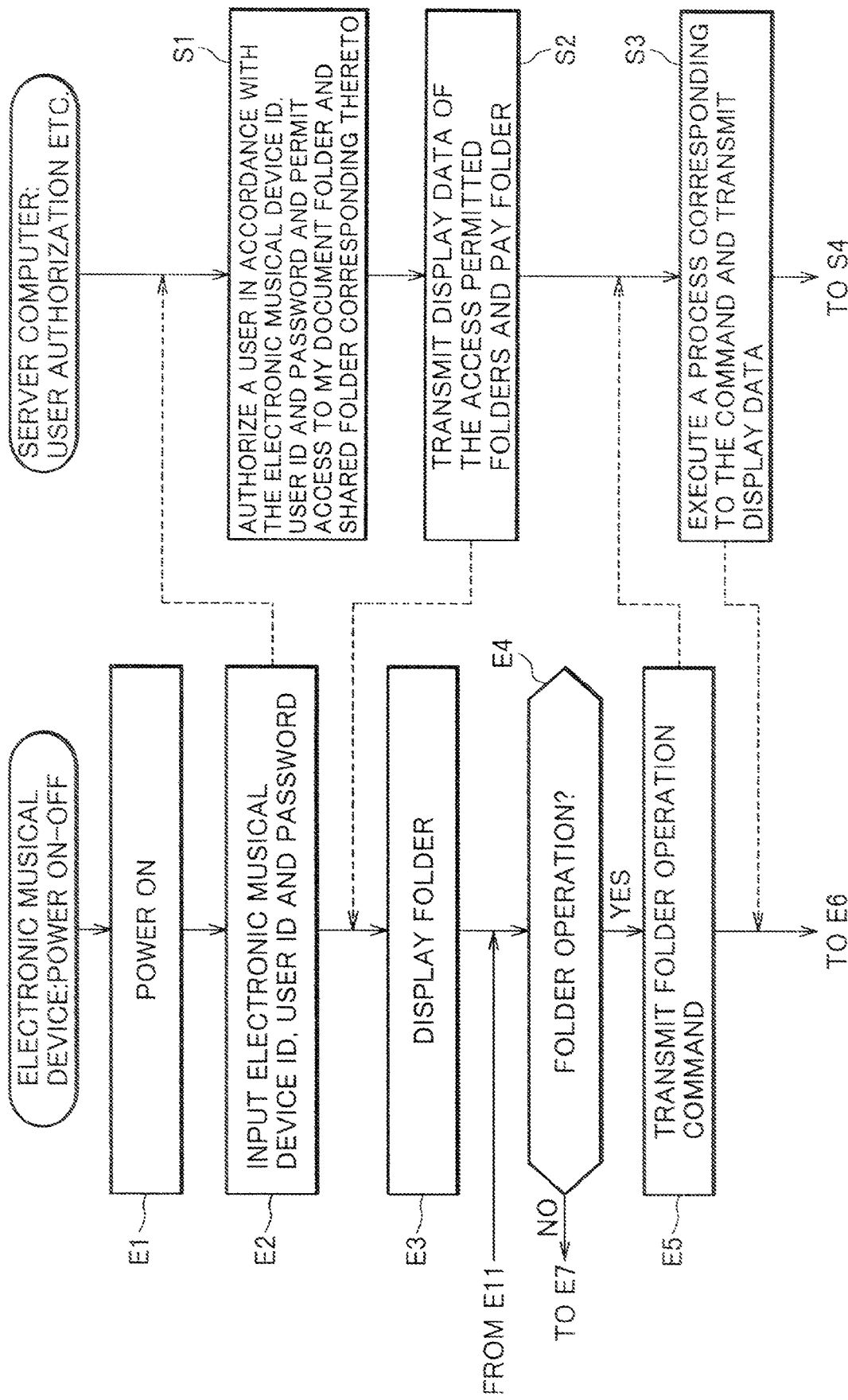
FIG. 6 is a part of a flow chart showing a main process of the musical contents storage system according to the embodiment of the present invention.
Figure 7:
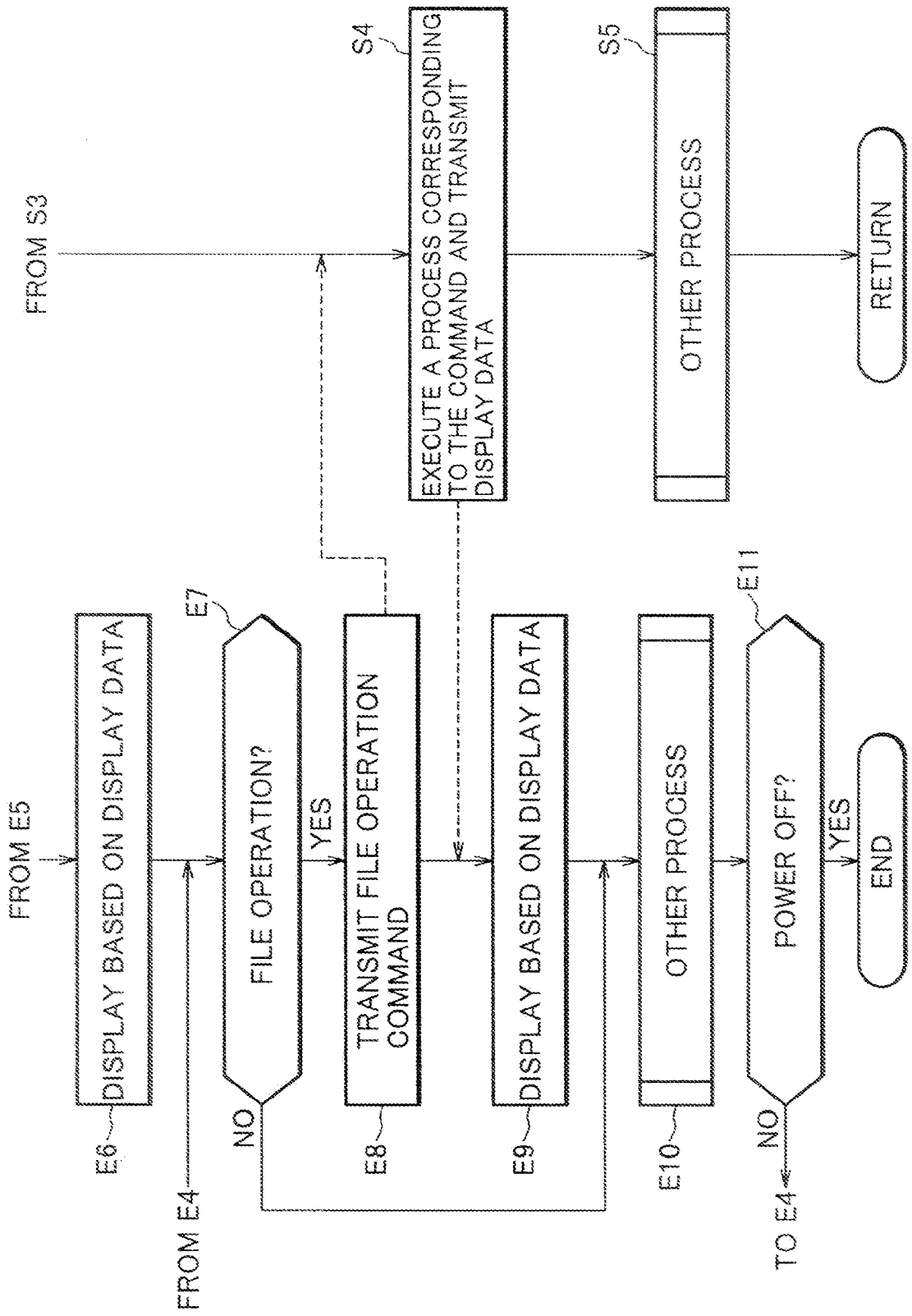
FIG. 7 is other part of a flow chart showing a main process of the musical contents storage system according to the embodiment of the present invention.

FIG. 6 and FIG. 7 are flow charts showing a main process of the musical contents storage system according to the embodiment of the present invention. This main process is called as a "musical contents providing process". And a process on the electronic musical device will be called as a "terminal side musical contents providing process" or a "terminal side main process", and a process on the server computer will be called as a "server side contents providing process" or a "server side main process".

On the electronic musical device side, after turning a power source of the device on and booting a terminal side musical contents providing process program (Step E2), first, an electronic musical device ID of the electronic musical device, a user ID and a password of the user using the electronic musical device 1, and the inputted electronic musical device ID, user ID and password are sent to the server computer.

The electronic musical device ID is a unique identifier provided to each electronic musical device by default, and it is embedded in the ROM 1B or the like when the device is manufactured and is input automatically. Also, it can be embedded in the RAM 1C or the like after manufacturing. For example, in the case that a user registration is performed to the manufacturer when the electronic musical device 1 is purchased, an automatic input of the electronic musical device ID at a time that the electronic musical device ID is sent from the manufacturer may set by the user. A device type identifier corresponding to a device type or a function of the electronic musical device 1 may be preferably included in the electronic musical device ID.

Also, setting the user ID and the password in advance is preferable. For example, the user accesses to the server computer 2 from the electronic musical device (electronic musical instrument and PC etc.) in advance and makes a user registration to the musical contents storage service to obtain a user ID and a password. Once user ID and password is input, this input can be omitted after the second accesses.

A process such as a user authorization or the like is executed in the server computer 2. That is, the user authorization is executed based on the electronic musical device ID, the user ID and the password sent from the electronic musical device. Once the authorization completed, the server computer 2 permits an access to the "my document" folder and the "shared" folder corresponding to the electronic musical device (Step S1). Each folder corresponding to the electronic musical device 1 is registered (assigned) as a usable folder in the server computer 2 at the time of the above-described registration. Next, the display data of the access permitted folders and the pay folder is sent to the electronic musical device 1 (Step S2).

According to the above, in the electronic musical device 1, a window display related to the usable folder that is permitted to access to the electronic musical device is displayed in the displaying device 1S based on the display data sent from the server computer (Step E3), and a folder operation by the user comes to be validated. And then, a folder operation detecting process to detect the folder operation by the user is executed (Step E4). When the folder operation is detected in the folder operation detecting process, a "folder operation" command is sent to the server computer 2 (Step E5).

When the server computer 2 receives the "folder operation" command, it executes a process corresponding to the command to transmit the displayed data obtained by the process to the electronic musical device 1 (Step S3). The folder operations include "open", "close", "create", "delete", and "copy" etc. For example, in the case of the "open" operation, the server computer 2 transmits the folder in the layer that is just under the folder executed the "open" operation or the file list as a display data to the electronic musical device.

The accessible folder for the electronic musical device is constructed to select a folder suitable for a device type or function of the electronic musical device from the classified folders in the "my document" folder by using a device type identifier included in the electronic musical device ID. For example, an "electronic score" folder is possible to display for the electronic musical device that can display a score, and the "electronic score" folder is not displayed for the electronic musical device that cannot display a score. Therefore, the user can be prevented from confusion. Also, the "shared" folder and the "pay contents" folders are constructed to select a classified folder providing to the electronic musical device 1 by using the device type identifier. For the folders below the "pay contents" folder, only "open" and "close" operations are possible but others like "create", etc. cannot be operated.

A process result corresponding to the "folder operation" command is displayed in the electronic musical device 1 (FIG. 7: Step E6). For example, in the "open" operation of the "pay contents" and the "my document" folders in the left in FIG. 4, the folders below each folder are listed on the "pay contents" and "my document" window as the right in FIG. 4. Also, in the "open" operation of the folder (for example "SMF") in the lowest folders (the third layer in FIG. 3), the musical information files stored in the folder are displayed.

When a display (Step E6) corresponding to the "folder operation" command is displayed, or when a folder operation is not detected by the folder operation detecting process (E4: NO), the musical information file is displayed on the display device 1S of the electronic musical device and there is possibility for the file operation by the user. Then a file operation detecting process to detect the file operation by the user is executed (Step E7). When the file operation is detected in the file operation detecting process, a "file operation" command is sent to the server computer 2 (E8).

When the server computer 2 receives the "file operation" command, it executes a process corresponding to this command and transmits a display data obtained by the process to the electronic musical device 1 (FIG. 7: Step S4). "File operation" may be "create", "delete", "copy", etc. For example, in the case of the "create" operation, new file is created to transmit the icon as a display data to the electronic musical device. In the file in the pay folders, only "copy" operation is possible, but "create" operation cannot be executed. After executing an "other process" (Step S5), the process will be returned to the standby state to receive an instruction from the electronic musical device such as an access and a command.

On the other hand, a process result corresponding to the "file operation" command is displayed in the electronic musical device 1 based on the sent display data (Step E9). After this displaying, or when the file operation is not detected in the file operation detecting process (Step E7: NO), an "other process" is executed. If turning off the power is not instructed, the electronic musical device returns to the folder operation detecting process (Step E4) to repeat the "folder operation" detecting (Step E4) through the "other process" (Step E10) until turning off the power is instructed. When turning off the power is instructed, this terminal side musical contents providing process is completed.

"Other process" may be a process executed between the electronic musical device 1 and the server computer 2 cooperatively with each other, such as the "reproducing/editing" and the "file transmitting/receiving" process, a "contents purchasing" process, a "contents detecting" process, "coauthoring" process, etc. and a process executed by the server computer 2 itself such as a "my document capacity changing" process or the like.

One user can access to the server computer 2 from a plurality of the electronic musical devices 1a and 1b. In this case, the same user ID and password may be input. In each of the electronic musical devices 1a and 1b used by the user, as described above, a visible classified folder will be changed according to the device type identifier contained in the electronic musical device ID.

Figure 8:
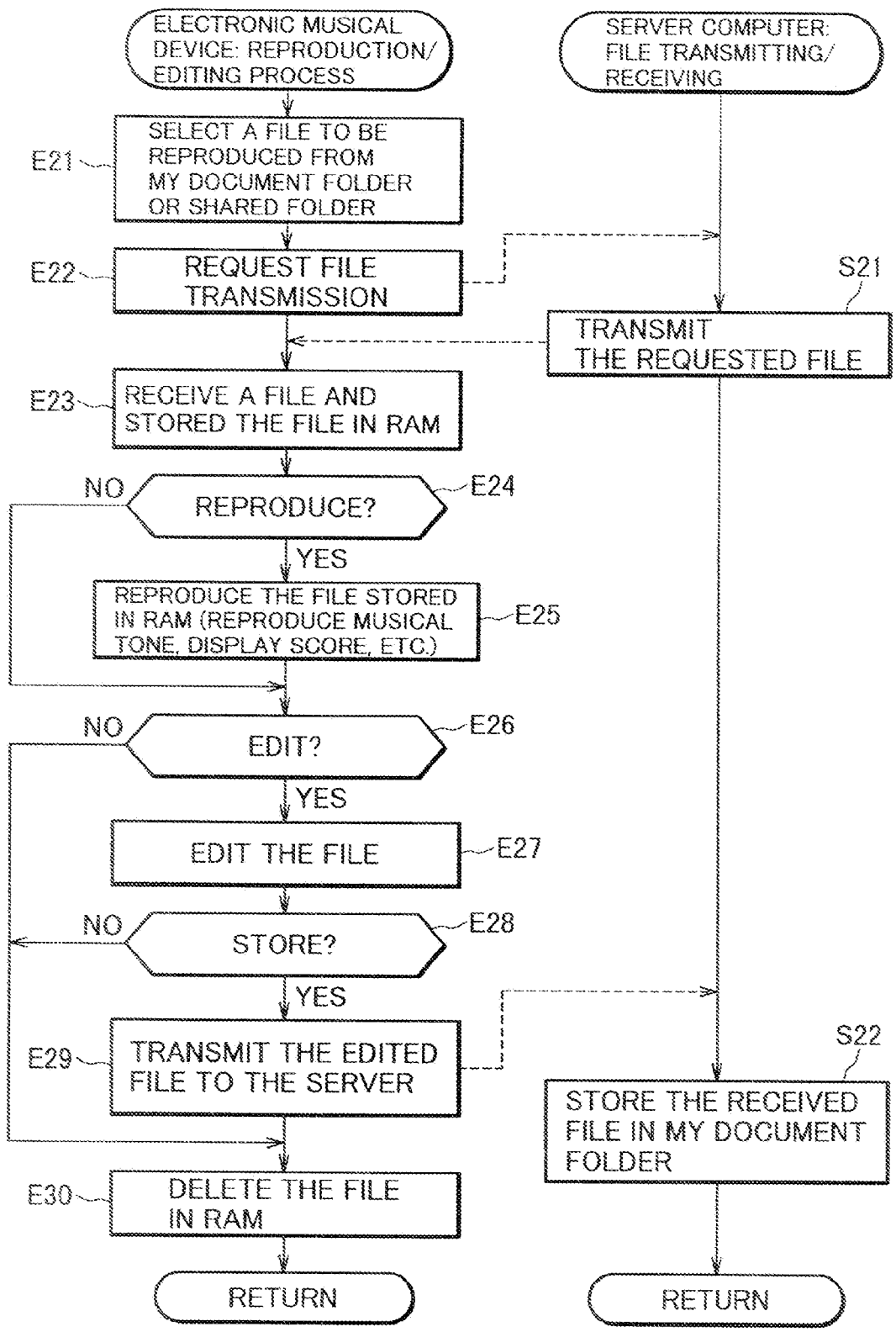
FIG. 8 is a flow chart showing a reproducing/editing process (terminal side) and a file transmitting/receiving process (server side) according to the embodiment of the present invention.

According to the embodiment of the present invention, musical information file (musical contents) stored in the server computer can be used for reproducing and editing on the electronic musical device, and the edited musical information file can be stored in the server computer again. FIG. 8 is a flow chart showing a reproducing/editing process (a terminal electronic musical device side) that enable to these reproducing, editing and storage and a file transmitting/receiving process (server side) according to the embodiment of the present invention.

A list of musical information files under the "my document" or the "shared" folder is displayed on the display device 1S in the electronic musical device 1 based on the displayed data sent from the server computer according to above-described "folder operation" and "file operation". When there is a musical information file that the user wants to reproduce or edit inside the folders, the user indicates/selects the file (Step E21) to execute an operation to request a file transmission. Then the electronic musical device transmits a "file transmission request" to the server computer 1 (Step E22).

The server computer 1 responds to the "file transmission request" from the electronic musical device 1 to transmit the requested musical information file to the electronic musical device 1 (Step S21). The electronic musical device 1 receives the file and stores in the RAM1C (Step E23). Also, a file selection window for selecting a way of using the file (for example, a window wherein selecting switches such as "reproduce", "edit", "cancel" etc. are configured) is displayed on the display 1S. Then a reproducing operation detecting process to detect whether the "reproduce" of the file is selected or not is executed (Step E24).

When the operation that selects the "reproduce" of the file is detected in the reproducing operation detecting process, the musical information file stored in the RAM1C is reproduced on the electronic musical device 1 (Step E25). For example, according to the file, a musical tone corresponding to the musical tone generators 1H, 1J and 1T is generated, or a score corresponding to the file is displayed on the display 1S.

After the reproducing process of the musical information file (Step E25), or when the "reproduce" operation is not detected in the reproducing operation detecting process (Step E24: NO), an editing operation detecting process to detect whether the "edit" of the file is selected or not is executed (Step E26). When the "edit" selecting operation is detected in the editing operation detecting process, the musical information file stored in the RAM 1C will be possible to be edited. Then it can be edited by the operation by the user (Step E27).

When the user terminates the editing operation and indicates editing termination, a selection window for selecting whether the edited musical information file (the edited file) is stored or not is displayed on the display 1S of the electronic musical device 1. Then, a storing operation detecting process to detect whether "store" of the edited file is selected or not is executed (Step E28). When the "store" selection is detected in the storing operation detecting process, the electronic musical device 1 transmits the edited file to the server computer 2 (Step E29).

After transmitting the edited file (Step E29), when the "edit" selection is not detected in the editing operation detecting process (Step E26: NO), or the "store" selection is not detected in the storing operation detecting process (Step E28: NO), musical information file stored in the RAM1C is deleted compulsory (Step E30). Then the process will be returned to the terminal side main process (FIG. 7: Step E11).

On the other hand, when the server computer 2 receives the edited file, it executes a process to store (newly written or overwritten) the received edited file in the "my document" or the "shared" folder corresponding to it. Then the process is returned to the server side main process (FIG. 7: "return").

Figure 9:
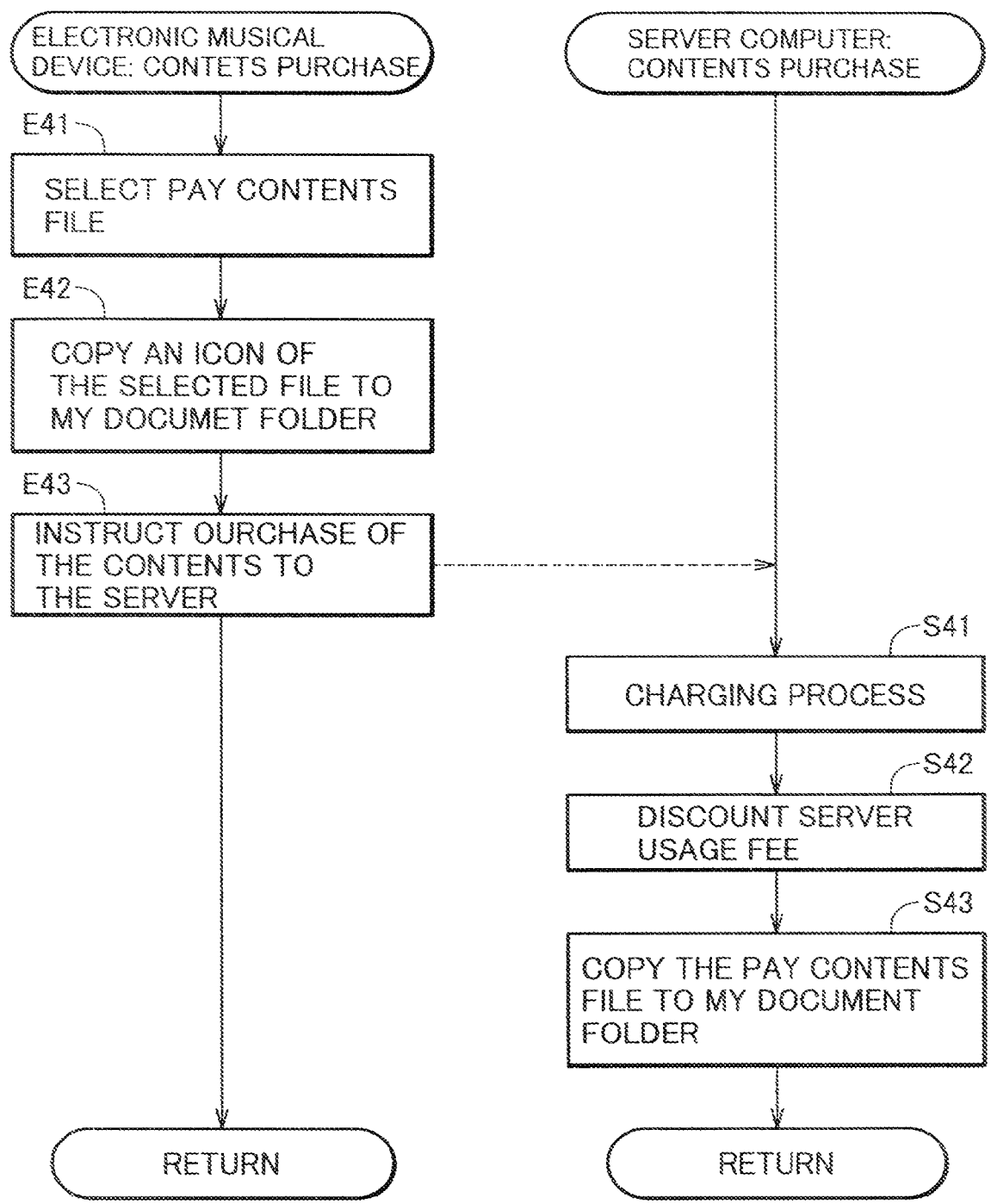
FIG. 9 is a flow chart showing a process for purchasing contents according to the embodiment of the present invention.

According to the embodiment of the present invention, the desired musical information file can be purchased by the simple operation just copying the musical information file (musical contents) stored in the "pay contents" folder in the server computer to the "my document" folder corresponding to the electronic musical device. FIG. 9 is a flow chart showing a "contents purchasing" process for purchasing these files.

On the displaying device 1S of the electronic musical device 1, based on display data transmitted from the server computer 2 in accordance with the above-described "folder operation" and "file operation", for example, as shown in the left side of FIG. 5, a list of the musical information files under the "pay contents" folder can be displayed in a window, and those under the "my document 2 folder can also be displayed in a window as shown in the right side of FIG. 5.

When there is a musical information file that the user wants to purchase in the "pay contents", the user of the electronic musical device 1 indicates/selects an icon of the file displayed in the "pay contents" window (Step E41) and executes an copying operation (drag and drop) of this icon to the "my document" window (Step E42). Then the electronic musical device 1 transmits the operation contents to the file with the "contents purchasing instruction" to the server computer 1 (Step E43). After that, the process returns to the terminal side main process (FIG. 7).

When the server computer 2 receives the "contents purchasing instruction" from the electronic musical device 1, a charging process corresponding to the purchased musical information file is executed to the user performed the "contents purchasing instruction" (Step S41). In the charging process, the usage period of the purchased musical information file (contents) may be selected by the user, and the usage fee may be varied depending on the usage period. For example, a range such as only one time use, a fixed period (e.g., one month etc.), or eternal use may be decided, and the fee will be decided in accordance with the decided range. In that case, the purchased file with the limited usage period will be deleted from the "my document" folder after the usage period elapsed. Also, the usage fee may preferably be presented to the user in advance such as when the list in the left of the FIG. 5 is displayed or when the icon is selected in the Step E41.

Then the server computer 2 executes a discount process of a server usage fee according to the contents purchase (Step S42). That is, when the pay contents (musical information file in the "pay contents" folder) is purchased, the server usage fee is discounted. In that case, the server usage fee may be discounted eternally or during the fixed period from the time of the purchase.

After the discount process of the server usage fee, the purchased file in the "pay contents" folder is copied based on the operation to the musical information file instructed the "contents purchasing instruction" in the electronic musical device, and the copied file is stored in the "my document" folder corresponding to the user (Step S42). Then the process returns to the server side music server side main process (FIG. 7).

Figure 10:
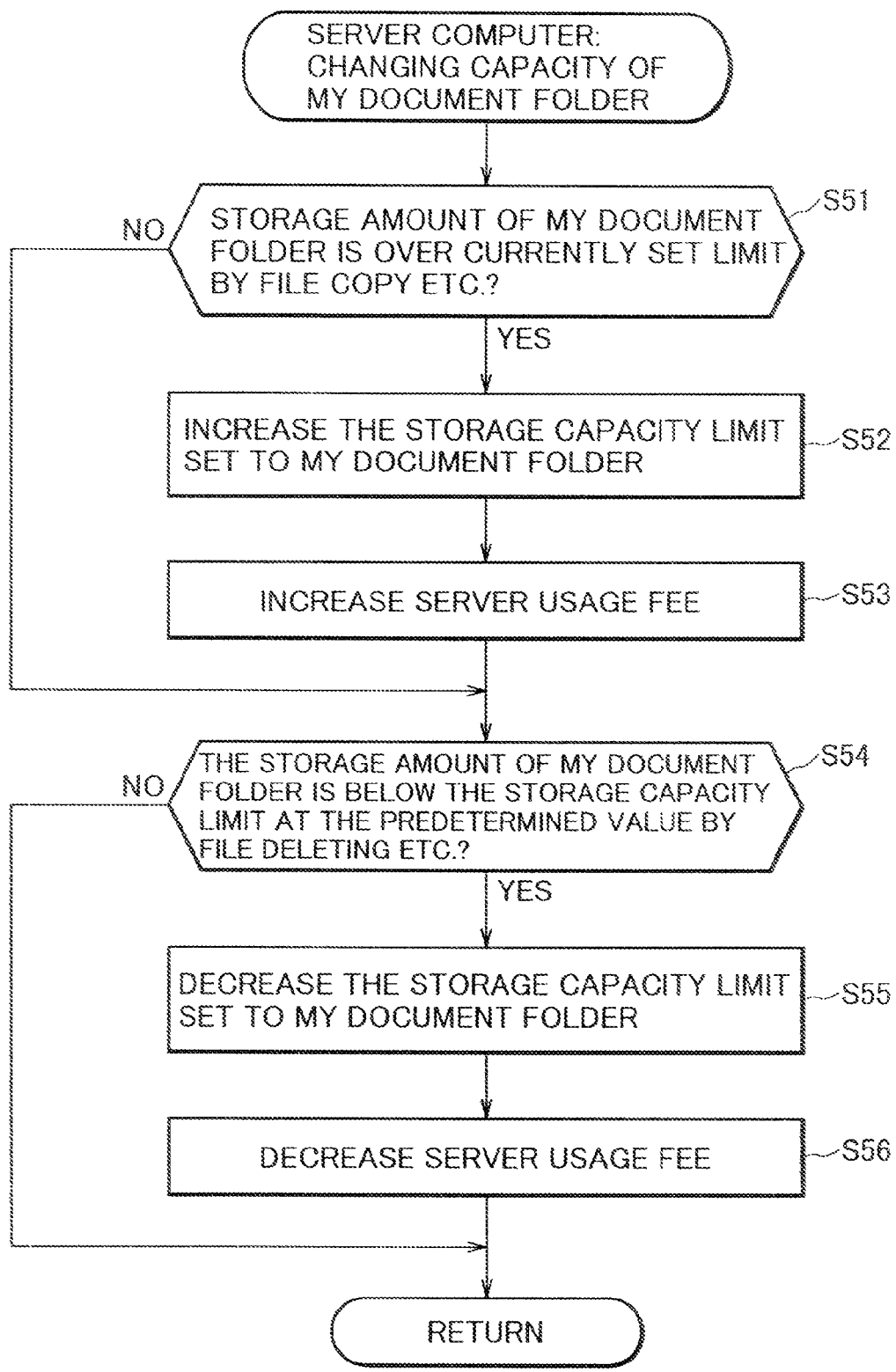
FIG. 10 is a flow chart showing a capacity changing process of the "my document" folder according to the embodiment of the present invention.

In the embodiment of the present invention, a storage amount of the "my document" folder can be changed automatically according to the amount of information of the musical information file stored in the "my document" folder. FIG. 10 is a flow chart showing a "my document capacity change" process to change capacity of the "my document" folder. The process flow is booted every time a file is executed in the "my document" folder of the server computer 2.

First, the server computer 2 executes a capacity over judging process (Step S51) for judging whether the storage amount of the "my document" folder is over the currently set limit of the storage capacity (hereinafter called "the storage capacity limit") or not by the file operations such as the newly write or over write (Step S22) or copy (Step S43) of the musical information file performed to each "my document" folder.

When the capacity over judging process judges the storage amount is over the storage capacity limit, the storage capacity limit set to the "my document" folder is increased (Step S52), a increase process of the usage fee to increase the server usage fee corresponding to the increased storage capacity limit (Step S53).

The server computer 2 executes an under capacity judging process (Step S54) for judging whether the storage amount of the "my document" folder is below the storage capacity limit (upper limit) at the predetermined value by the file operations such as rewrite (Step S22) or delete (e.g., based on the "delete" operation) of the musical information file to each "my document" folder after the usage fee increase process (Step S52) or when the storage capacity over judging process judges the storage amount is not over the storage capacity limit (Step S51: NO).

When the under capacity judging process (Step S54) judges the storage amount is below the storage capacity limit at the predetermined value, the storage capacity set to the "my document" folder is decreased (Step S55), and an usage fee discount process (Step S56) to discount the server usage fee corresponding to the decreased storage capacity limit is executed. Then the process returns to the server side main process (FIG. 7) after the usage fee discount process (Step S56) or when the under capacity judging process judges the detected storage amount is not below the current storage capacity limit at the predetermined value (Step S54: NO).

The server ("my document" folder) usage fee is decided beforehand in accordance with some grades of capacities, for example, one price for the storage capacity (from OMB) to 5 MB, another price for that (from 5 MB) to 10 MB, and so on. When the increased or decreased storage capacity limit is re-decided (Steps S52, S55), the server usage fee will be increased or decreased in accordance with the increase or decrease of the storage capacity limit (Steps S53, S56). Further, when the server usage fee is increased or decreased, the server computer 2 may ask the user whether the increase (decrease) of the server usage fee is admitted or not. Also, in the case of the "shared" folder, the server usage fee is increased or decreased as same as the process described the above (each user's share of the server usage fee is defined by the special contract).

Figure 11:
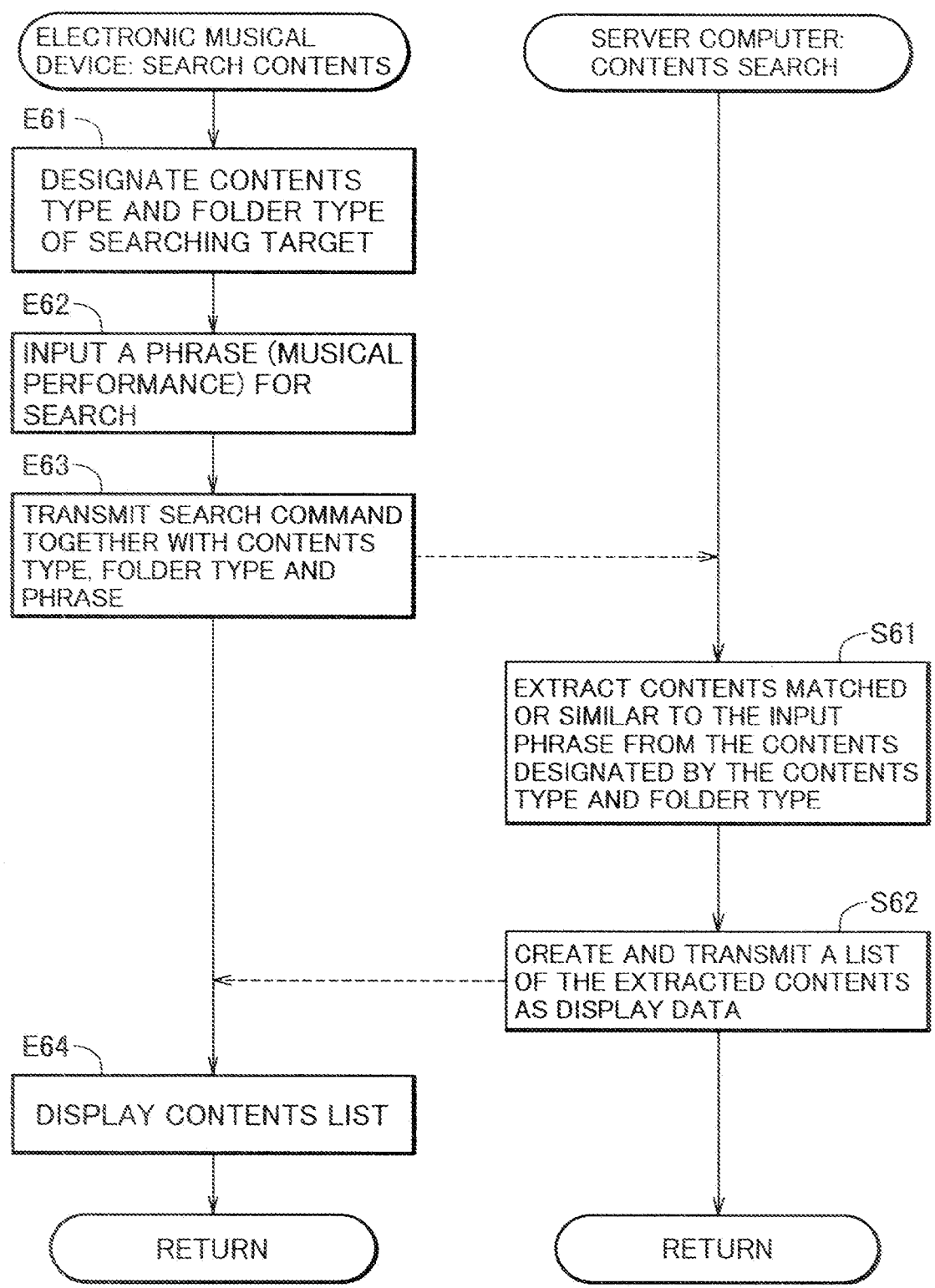
FIG. 11 is a flow chart showing a process for contents searching according to the embodiment of the present invention.

According to the embodiment of the present invention, when a search condition is set at the electronic musical device, the server extracts the musical information file (contents) matched to the search condition and can notify the search result to the electronic musical device. FIG. 11 is a flow chart showing the "contents searching" process to search the file.

In this flow chart, first, a searching target is designated (Step E61) by the contents types (SMF, the ringer melody, etc.) and the folder types (pay contents, my document, etc.). Next, in order to make a further proper search possible in a different view from that of the structure of the folders to be searched, for example, a phrase (a musical performance) for the search is input (Step E62). Then a searching command is sent with the contents type, the folder type and the phrase to the server computer 2 from the electronic musical device 1 (Step E63).

The server computer 2 received the searching command searches matched or similar contents to the input phrase from the contents in the designated target by the received contents type or folder type, and extracts corresponded contents (Step S61). When a searching target, for example, "contents type=an electronic score", "folder type=pay contents and my document" is instructed, the contents matched to the input phrase is extracted from electronic score files in the "pay contents" folder and the "my document" folder.

After the server computer 2 forms the extracted contents list and transmits as a display data (Step S62), the process returns to the server side main process (FIG. 7). After the contents list based on the received display data is displayed on the display 1S (Step E64) in the electronic musical device 1, the process returns to the server side main process (FIG. 7).

If the extracted contents is in the "pay contents" folder, it can be purchased. And if it is in the "my document" or the "shared" folder, it can be used.

This contents search process is preferably constructed to search not only perfectly matched contents but also contents different from the input phrase, key or some musical notes. By that, a user with an unsure memory and a user who does not perform the phrase very well can find the aimed contents.

Figure 12:
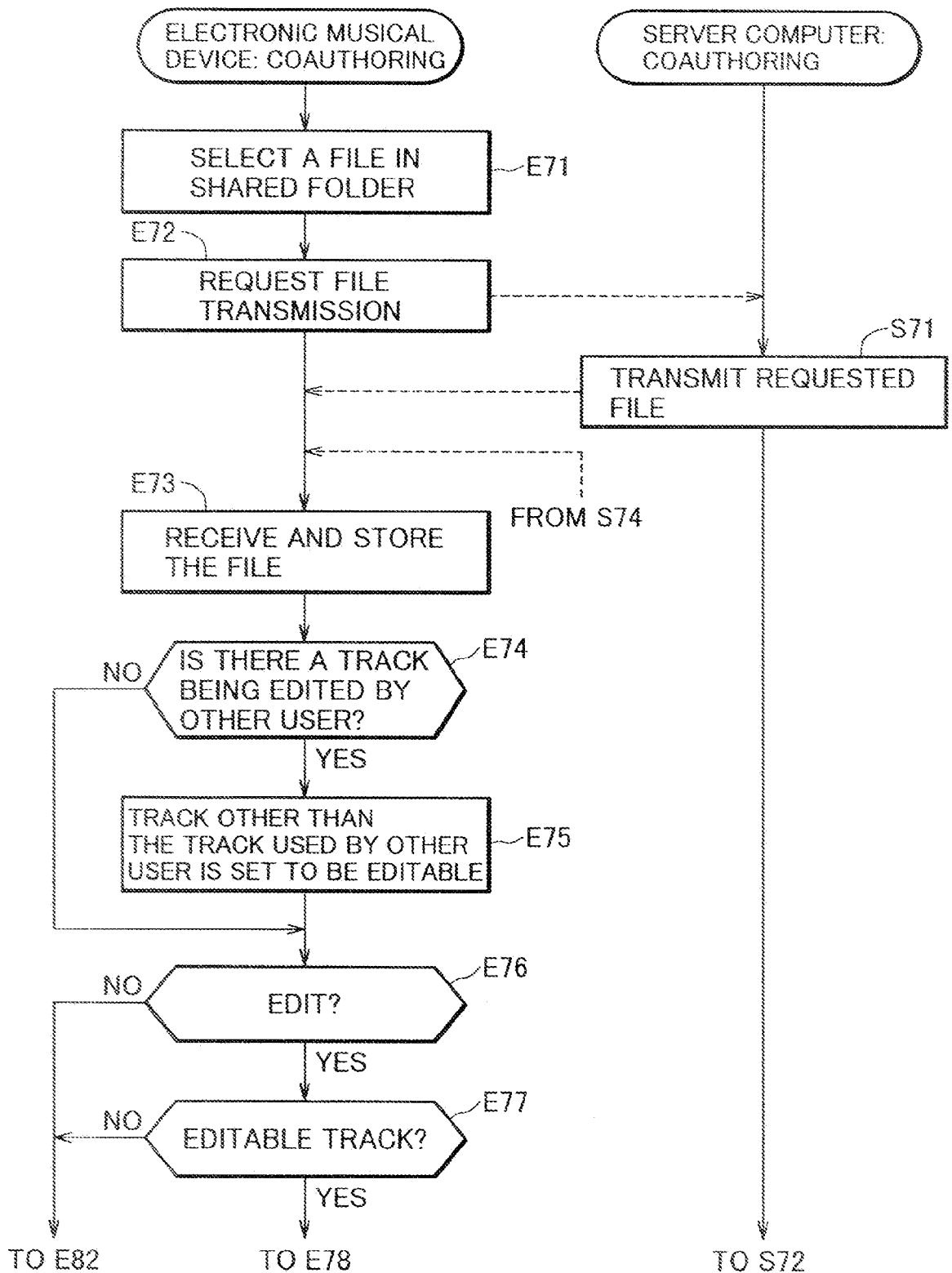
FIG. 12 is a flow chart showing a process for coauthoring according to the embodiment of the present invention.
Figure 13:
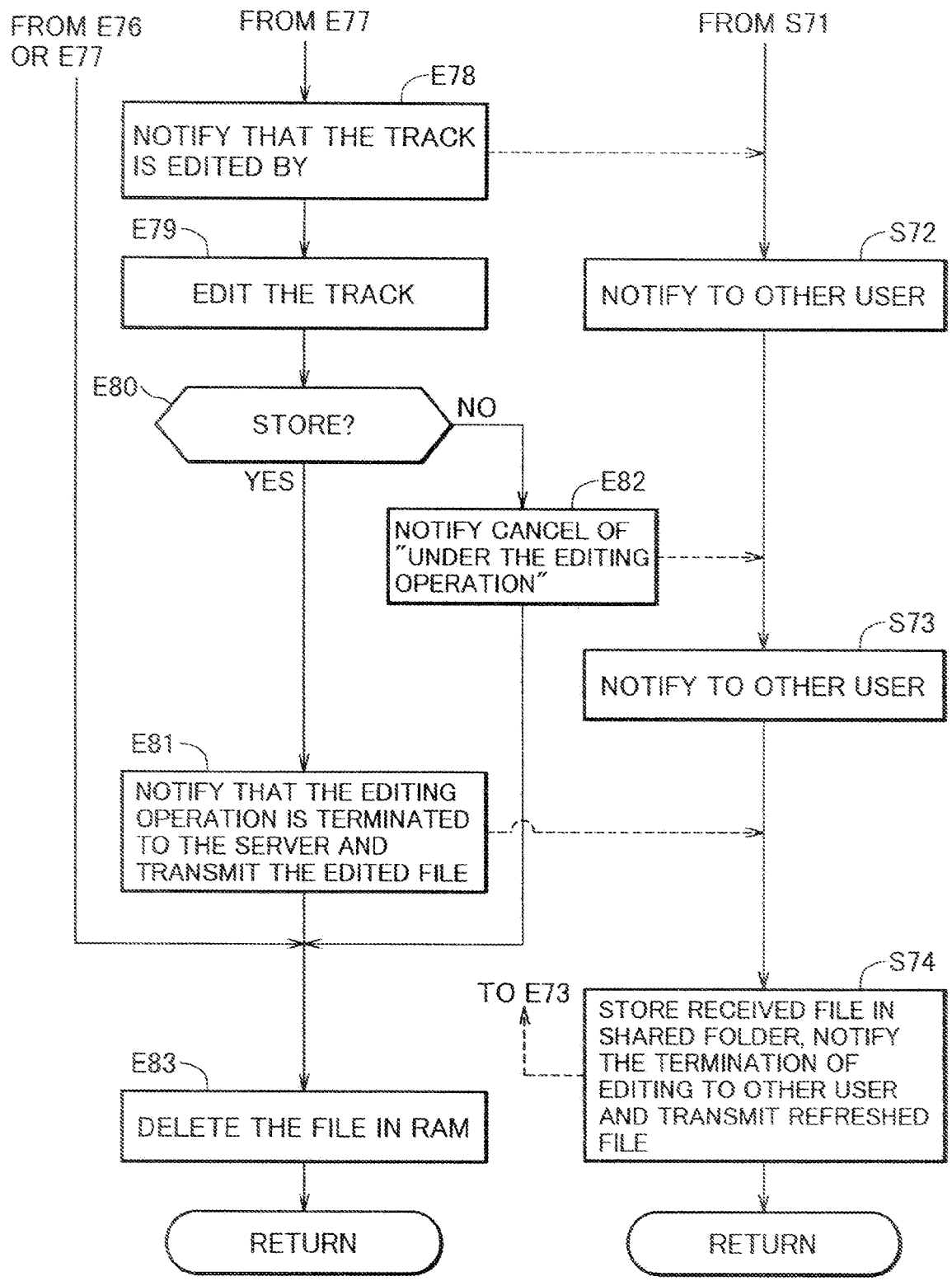
FIG. 13 is other part of a flow chart showing a process for coauthoring according to the embodiment of the present invention.

According to the embodiment of the present invention, musical information file (contents) in the "shared" folder of the server computer is used and edited among the plurality of the electronic musical devices. FIG. 12 and FIG. 13 are flow charts showing these "coauthor" processes that realize musical information editing among the plurality of the electronic musical devices.

This flow chart is started by selecting one musical information file in the "shared" folder at one electronic musical device (electronic musical device 1a) (Step E71) and requesting to the server computer 2, transmission of the selected file (Step E72). For responding to that, the requested file is transmitted (Step S71) from the server computer 2, and the electronic musical device 1a stores the received file from the server computer 2 in the RAM 1C (Step E73).

The received musical information file is judged whether there is a track being edited by other user or not (Step E74) before editing. When there is a track being edited by other user, a track (or tracks) other than the track edited by other user will be set to be editable (Step E75), and the process proceeds to the editing steps (Steps E76 to E81). When there is no track being edited by other user, the process proceeds to the editing steps (Steps E76 to E81) without imposing any restrictions on the target track for editing operation.

When the process proceeds to the editing stage, the electronic musical device 1 executes an editing instruction detecting process that detects either of an "edit" or a "cancel" switch is manipulated (Step E76). In this editing instruction detecting process, when the process detects that starting of the editing operation is instructed by manipulation of the "edit" switch, the electronic musical device 1a enters into an edit mode. Then, when the user selects a track to be edited, an editability judging process to judge whether the track is an editable track or not (Step E77).

When the track is judged as the editable track in the editable track judging process, the electronic musical device 1a notifies that the track is under the editing operation to the server computer 2 (FIG. 13: Step E78). Also, the track can be edited by the user in the electronic musical device 1a (Step E79). On the other hand, the server computer 2 that received the notice from the electronic musical device 1a notifies to other user using other electronic musical device 1b ("1b" represents the electronic musical device other than the electronic musical device 1a) editing the same file that the predetermined track of the file is being edited by the user of the electronic musical device 1a (FIG. 13: Step S72).

When the user instructs the end of the editing operation in the electronic musical device 1a, an end instruction display to make the user select whether the track edited musical information file (the edited file) is stored or not is displayed on the display 1S. Then an end operation detecting process to detects whether the "store" of the edited file is selected or not (Step E80). When the "store" is detected in the end operation detecting process, the electronic musical device 1a transmits the notice of the end of the editing operation with the edited file to the server computer 2 (Step E81). On the other hand, the "store" is not detected, a cancellation of the noticed "under the editing operation" (E78) is notified to the server computer 2 (Step E82).

Then, after transmitting the comment of the end of the editing process and the edited file (Step E81), when the selection of the "edit" is not detected in the editing instruction operation detecting process (Step E76: NO), when the editability judging process judges that the track is not the editable track (Step E77: NO), or after notifying cancellation of the editing operation (Step E82), the musical information file stored in the RAM1C is deleted compulsory. Then the process returns to the terminal side main process (FIG. 7: Step E11).

On the other hand, when the server computer 2 receives the notice to cancel the "editing operation" (Step E82), the server computer 2 notifies the reception of the canceling notice to the electronic musical device 1b used by the other user (Step S73). Also, when the comment of the end of the editing process and the edited file (Step E81) is received, a process to store the received edited file in the "shared" folder (refresh by over write) is executed. At the same time, the end of the editing operation of the electronic musical device 1a is notified and the edited file (the file refreshed by over write) is transmitted to the electronic musical device 1b of other user (Step S74). Then the process returns to the server side main process (FIG. 7). It is preferable to over write and transmit only the data in the edited track in the above refreshing by over write process and the transmitting process to other electronic musical device 1b.

For responding to the above, other electronic musical device 1b receives the musical information file (Steps E81, S74) edited in the electronic musical device 1a (FIG. 12: Step E73), and refreshes the file in the RAM1C. Then, along with the flow chart (Steps E73 to E83) shown in FIGS. 12 and 13, similar to the steps explained above, the editing operation can be performed based on the received new musical information file. It is preferable to refresh only the track edited in the electronic musical device 1a.

Although whether the track being edited by other user (the user of, for example, the electronic musical device 1b) is included in the received musical information is judged before the editing operation in the electronic musical device 1a (Step E74) in the above-described flow chart, a track which is started to be edited by other electronic musical device 1b while one user is editing other track can be prohibited to be edited by said one user upon the notification of the start of the editing operation by the other electronic musical device 1b.

Also, the process can edit not only a whole track but also a part of the track. In that case, a range of the track is designated to be "under the editing operation".

According to the above-described embodiment, each electronic musical device has an electronic musical device ID, and the server computer refers the electronic musical device ID upon the authorization. That is, the user cannot be authorized by only the user ID and password. Therefore, the illegally obtained user ID and password cannot be used, and the musical contents storage system with higher security can be constructed. However, certain level of the security can be accomplished with the user ID and password, therefore the electronic musical device ID may be omitted. Also, the device type identifier may not be contained in the electronic musical device ID and may be notified independently to the server computer.

The electronic musical device may not be included a function to connect to the communication network directly. In that case, first, the electronic musical device may be connected to other personal computer and mobile information terminal. Then it may be connected to the communication network via the personal computer and the mobile information terminal.

The present invention has been described in connection with the preferred embodiments. The invention is not limited only to the above embodiments. It is apparent that various modifications, improvements, combinations, and the like can be made by those skilled in the art.

What are claimed are:

1. An electronic musical device, comprising:
   a connecting unit that connects with a content providing server having a storage area corresponding to a user of the electronic musical device and storing musical content via a communication network;
   a temporally storage unit that temporally stores the musical content received from the content providing server via the communication network in accordance with a content transmitting request to the content providing sever;
   a display unit that displays an operation selecting screen for selecting a way of operating to the musical content;
   a content operating unit that performs an operation to the musical content stored in the temporally storage unit in accordance with a selection made in the operation selecting screen;
   a detecting unit that detects an operation of saving the musical content to which the operation has been performed by the content operating unit when the operation to the musical content is finished;
   a first transmitting unit that transmits the musical content to which the operation has been performed to the content providing server when the detecting unit detects the operation of saving;
   a deleting unit that compulsory deletes the musical content from the temporally storage unit;
   a second transmitting unit that transmits an identifier of the user; and
   wherein the electronic musical device will be able to receive the musical content from the storage area of the content providing server after certification by the content providing server of the identifier of the user.

2. A computer readable medium having a program which a computer executes to realize a musical content providing process for an electronic musical device, comprising the instructions for:

(a) connecting with a content providing server having a storage area corresponding to a user of the electronic musical device and storing musical content via a communication network;
   (b) storing, in a temporally storage unit, the musical content received from the content providing server via the communication network in accordance with a content transmitting request to the content providing sever;
   (c) displaying an operation selecting screen for selecting a way of operating to the musical content;
   (d) performing an operation to the musical content stored in the temporally storage unit in accordance with a selection made in the operation selecting screen; and
   (e) detecting, when the operation to the musical content is finished, an operation of saving the musical content to which the operation of instruction (d) has been performed;
   (f) transmitting the musical content to which the operation has been performed to the content providing server when the operation of saving of instruction (e) is detected;
   (g) compulsory deleting the musical content from the temporally storage unit;
   (h) transmitting an identifier of the user; and wherein the electronic musical device will be able to receive the musical content from the storage area of the content providing server after certification by the content providing server of the identifier of the user.

3. The electronic musical device according to claim 1, wherein the operation to the musical content is editing the musical content.

4. The electronic musical device according to claim 1, wherein the user of the electronic musical device is allowed to privately use the storage area of the content providing server.

5. The electronic musical device according to claim 1, wherein a group consisting of a plurality of users including the user of the electronic musical device is allowed to use the storage area of the content providing server.

6. The electronic musical device according to claim 1, wherein
   the second transmitting unit further transmits an identifier of the electronic musical device together with the identifier of the user, and
   the electronic musical device will be able to receive the musical content from the storage area of the content providing server after certification by the content providing server of the identifier of the user and the identifier of the electronic musical device.

* * * * *